United States Patent Office 2,726,227
Patented Dec. 6, 1955

2,726,227
VINYL CHLORIDE RESINS STABILIZED WITH TIN MERCAPTIDES

William E. Leistner and Olga H. Knoepke, Brooklyn, N. Y.

No Drawing. Application June 30, 1950, Serial No. 171,549

8 Claims. (Cl. 260—45.75)

This invention relates to a stabilizer for vinyl resins.

The invention is particularly useful in connection with stabilizing polyvinyl chloride resins. For this reason the invention will be illustrated by description in connection with such use.

The stabilizers which are in most common use today for polyvinyl chloride resins include such materials as dibutyl tin maleate or the corresponding dilaurate. These stabilizers have the disadvantage of requiring a Grignard reagent in their synthesis and being therefore relatively expensive. They have also the disadvantage of being heat unstable at the high temperatures normally encountered in the processing of vinyl compounds, this instability causing objectionable discoloration of the plastic. Also, at least occasionally, the stabilizers cause surface bloom.

We have now discovered a class of stabilizers that are more effective in preventing discoloration and decomposition at elevated temperatures, a class which may be manufactured without the Grignard synthesis.

Briefly stated, the invention comprises vinyl chloride resins and, as stabilizers, a tin mercaptide, a simple derivative thereof, or a mixture of individual ones of this general class with each other.

Our new stabilizer is compounded with the vinyl resins with conventional equipment and technique. In fact our method of manufacturing the new stabilized plastics is the conventional one except as hereinafter specifically indicated.

As the vinyl resin used, we prefer polyvinyl chloride. We use this in the form of either the polyvinyl chloride alone, copolymers such as the copolymer of vinyl chloride with vinyl acetate, polyvinylidine chloride, or copolymers of vinylidine chloride and vinyl chloride.

In general, the resin is a vinyl halide resin, this term being used to include vinyl halide polymers; copolymers with vinyl acetate, vinylidine chloride, styrene, dialkyl fumarate or maleate, or other alkyl esters of mono-olefinic acids. The vinyl halide used is ordinarily and preferably the chloride, although others such as the bromide and fluoride may be used.

The stabilizer used is a member of the general class of tin mercaptides. The stabilizer must be substantially non-volatile at the ordinary temperatures, stable on exposure alone to air, light, and moderately elevated temperatures such as 350° to 450° F., and soluble in the selected vinyl resin, that is, compatible to the extent that it may be compounded with the resin in compounding operations that are usual in this industry. Examples of the stabilizers which meet these general requirements and that are used to advantage by us are the following:

| Name | Formula |
|---|---|
| Tin tetra-dodecylmercaptide | Sn(S.C₁₂H₂₅)₄ |
| Tin tetra-phenylmercaptide | Sn(S.C₆H₅)₄ |
| Tin dibutyl di-dodecylmercaptide | (C₄H₉)₂Sn(S.C₁₂H₂₅)₂ |
| Tin dibutoxy di-octylmercaptide | (C₄H₉O)₂Sn(S.C₈H₁₇)₂ |
| Tin dibutoxy di-phenylmercaptide | (C₄H₉O)₂Sn(S.C₆H₅)₂ |
| Tin diphenoxy di-butylmercaptide | (C₆H₅O)₂Sn(S.C₄H₉)₂ |
| Tin diphenoxy di-phenylmercaptide | (C₆H₅O)₂Sn(S.C₆H₅)₂ |

Mixtures of two or more of the above.

The type formula for this class of stabilizers may be written as follows:

$$(R'S)_xSnR^2_{4-x}$$

In this formula R' and R² represent monovalent groups containing hydrogen and 1 to 18 carbon atoms each. Examples of such groups are alkyls such as methyl, ethyl, butyl, octyl, dodecyl, and octadecyl; aryls such as phenyl, tolyl, or xylyl; oxyalkyl and oxyaryl such as C₃H₇O, C₄H₉O, C₈H₁₇O, C₆H₅O, C₆H₄.CH₃O, and C₆H₃(CH₃)₂O; and the furfuryl and tetrahydrofurfuryl groups.

R' and R² may represent the same or different ones of these groups and R' and R² may individually represent different ones of the groups as in the formula

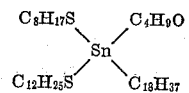

In the type formula, x is an integral number within the range 1 to 4. Examples of tin mercaptides in which R' and R² are C₄H₉ and x varies from 4 to 1 are the following:

| | |
|---|---|
| Sn(S.C₄H₉)₄ | x=4 |
| C₄H₉.Sn(S.C₄H₉)₃ | x=3 |
| (C₄H₉)₂Sn(S.C₄H₉)₂ | x=2 |
| (C₄H₉)₃Sn.S.C₄H₉ | x=1 |

As to proportions, we use 0.5 part to 5 parts of our stabilizer for 100 parts of the vinyl resin. Larger proportions may be used but without a corresponding increase in stability of the compounded plastic. Lower proportions give products that lack the desired stability. In commercial operations, we use 2 to 3 parts of our stabilizer for 100 of the resin.

The stabilizer is compounded to advantage with the resin as follows:

Weigh the vinyl resin into a dry blender and then add to it plasticizer, our stabilizer, and any colors, pigments and fillers desired. The whole mass is then agitated, as by tumbling, to produce a uniform blend. The material is then transferred to a Banbury mixer where it is fused or fluidized at elevated temperature. The material is then dropped and transferred to a warmup mill and from the mill to a 3 or a 4 roll calender. Here the material is sheeted out in the form of a film of desired gage.

The above is the procedure for forming a film.

In making solutions of our plastic, the material is sheeted out in strips directly from the warmup mill and then dissolved in a churn or suitable mixer after the addition of the selected solvent.

To make extruded products, the sheeted product is transferred to an extruder. Here it is formed into sheets or various shaped or pelletized for molding or subsequent extrusion procedures.

Mixing operations and other processing steps are conventional except as herein stated to the contrary.

The temperature used in making the blends of the compounds is elevated, to cause fluidizing of the mass or to maintain the mass in semifluid condition during such steps as sheeting or extrusion. The temperatures to be used vary with the particular resin used, in manner well known in the art. These temperatures usually fall within the range 180° to 450° F.

Proceeding in this manner, we make plastic compositions that are resistant to discoloration on heating. Making heat tests at 350° F., for instance and comparing the polyvinyl chloride plastic containing our stabilizer (dibutyl tin di-dodecylmercaptide, for instance) with such plastic containing conventional dibutyl tin maleate, we find that the former discolor only about one-half as much in a given period of time and at the same temperature as does the corresponding vinyl plastic made with the conventional dibutyl tin maleate.

In addition, our stabilizers avoid the formation of bloom, the dull or somewhat greasy appearance that sometimes forms on the surface of the plastic containing conventional stabilizers during normal shelf aging.

We attribute the greater heat stability of plastic containing our stabilizer, in part at least, to the pronounced receptiveness for by-product HCl from decomposition of the resin or to the formation of oxidation products of mercaptan such as disulfides, sulfoxides, and sulfones, the mercaptan itself constituting an antioxidant. The absence of the bloom on the treated sheets we attribute to greater compatibility and less tendency to oozing out of the stabilizer or to decreased tendency to separation of products of the thermal decomposition on the surface of the heated plastic.

The invention will be further illustrated by detailed description in connection with the following examples of the manufacture of plastics with our improved stabilizers and the preparation of the stabilizers themselves.

EXAMPLE 1

The general procedure of the general method of making a film is followed.

100 parts of Geon 101 (vinyl chloride polymer), 50 parts of dioctyl phthalate plasticizer, and 2 parts of stabilizer are mixed by tumbling for a period of one hour. The stabilizer used is dibutyl tin di-dodecylmercaptide $(C_4H_9)_2Sn(S.C_{12}H_{25})_2$. The whole is then transferred to a Banbury mixer and fused for 10 minutes at a temperature of approximately 300° F. It is then dropped and transferred to a warmup mill whose roll temperatures are also at 300° F. The material is then fed as needed to a 3 or a 4 roll calender. The roll temperatures of the calender range from 280°–350° F. The vinyl compound is calendered into a film at .004 inch or any other desirable gage.

EXAMPLE 2

The following procedure is used to advantage in making a finished solution of the resin. We use 100 parts of Vinylite VYNS (vinyl chloride and acetate copolymer). This is weighed into a dry blender. 40 parts of plasticizer, in this case, tricresyl phosphate, is added to the dry blender. 2 parts of stabilizer tin tetra-phenylmercaptide are next added. The whole mass is agitated by tumbling for 30 minutes and then transferred to a 2-roll mill whose roll temperatures are at about 240° F. The mass is fluidized on the mill and then sheeted into strips which are added to a mixture consisting of 3 parts of methyl ethyl ketone and 1 part of toluol in a conventional mixer. The compound is agitated at room temperature in the mixer until complete solution results. The proportion of solvent used will vary with the concentration of solution desired as, for instance, from 500 to 3,000 parts of solvent to 100 parts of the vinyl chloride resin used.

EXAMPLE 3

In making an extruded product the following is a preferred procedure. We use 100 parts of Geon 101 weighed into a dry blender along with 40 parts of dioctyl sebacate plasticizer and 2 parts of tin tetra-dodecylmercaptide. 5 parts of titanium dioxide is added as filler. Color is also added. The whole mass is then tumbled for a period of about 1 hour and is then transferred to a Banbury mixer whose temperature is at approximately 300° F., for fusion. The mass is then dropped and transferred to a warmup mill. Strips are taken off and fed into the hopper of an extruder and the compound is extruded in the form of a solid round rod whose diameter is approximately ⅜ inch. The rod of compound is cooled and sliced to form small pellets. These pellets are then used for the extrusion of vinyl strips or sheets or to cover copper wire for insulation purposes.

EXAMPLE 4

The procedure of Examples 1, 2 or 3 is followed with the exception that any one of the stabilizing agents referred to above is substituted on a pound for pound basis for the stabilizer used in any of the above examples.

EXAMPLE 5

The procedure of Examples 1–4 is followed with the exception that any one of the vinyl resins listed herein is substituted on a pound for pound basis for the polyvinyl resin in these examples.

Products made as described are satisfactorily stable when exposed to heat or light under usual conditions of storage or use and do not bloom when warmed.

EXAMPLE 6

*Making tin tetraphenylmercaptide*

8.8 g. thiophenol were dissolved in 40 cc. alcohol and a solution of 4.5 g. $SnCl_2.2H_2O$ in 30 cc. alcohol added. The mixture was allowed to stand overnight in contact with the air. A yellowish crystallized solid precipitated which was sucked off and washed once with 20 cc. ice cold alcohol. M. P. 63–64°.

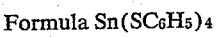

This product is formed according to the equation:

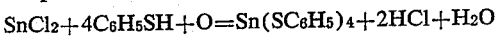

EXAMPLE 7

*Making tin tetradodecylmercaptide*

To 200 g. commerical dodecylmercaptan were added 26 g. anhydrous $SnCl_4$. A slight exothemic effect was observed. The mixture was heated to 150° C. for 2 hours. During the heating period a small amount of precipitate was formed which was filtered off. The filtrate was vacuum distilled to drive off the excess of mercaptan. 85 g. liquid residue was obtained which crystallized in the ice box and showed a melting point of 28–30° C. The analysis showed Sn 11.9% calculated 12.63%.

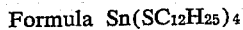

EXAMPLE 8

*Making dibutyl tin didodecylmercaptide*

32 g. commercial tin dibutyl dichloride (94% active) were mixed with 40 g. dodecylmercaptan and heated on the boiling water bath for one hour. The reaction product was taken up in 100 cc. benzene and washed first with a 2% NaOH solution and then with water to take out all HCl formed in the reaction. After drying over $Na_2SO_4$, the benzene was distilled off and a colorless liquid residue obtained. Yield 55 g.

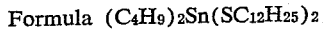

Any one of the stabilizers of this invention may be made by the procedure described, with obvious substitution in the list of reacting materials. The nature of the substitution will be illustrated by reference to the formulas for the materials which in the underscored parts determine the kinds of groups joined to tin in the finished product.

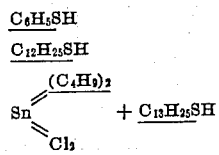

The underscored parts may be changed as desired, to any meaning of R' or R² above, to give the groups selected for occurrence in the finished product. Only the replaceable acid hydrogen of the SH group, the tin, and the Cl are unchanged in making the various ones of the product.

The reactions are moderated by cooling or warming, when necessary to give a satisfactory rate of reaction. The by-product HCl is caused to escape to the air, as by exposure of the reaction batch in a shallow dish to air, by blowing through the batch bubbles of carbon dioxide, or by neutralizing the HCl with sodium carbonate or calcium carbonate and removing the soluble chloride so formed by water washing.

During the reaction, the batch may be in diluted condition, the diluent being an inert, volatile material such as toluene, xylene, or naphtha or an excess of the selected mercaptan when the mercaptan itself is volatile.

It will be understood that it is intended to cover all changes and modifications of the examples of the invention herein chosen for the purpose of illustration which do not constitute departures from the spirit and scope of the invention.

What we claim is:

1. A plastic composition characterized by improved heat stability and non-blooming at temperatures as high as 350° F., the plastic composition comprising a blend of polyvinyl chloride resin and a stabilizer therefor selected from the group consisting of compounds of the type formulas $R'SSnR''_3$, $(R'S)_2SnR''_2$, and $Sn(R'S)_4$ in which $R'$ and $R''$ are monovalent groups containing 1–18 carbon atoms each and are selected from the group consisting of alkyls, aryls, furfuryl, and tetrahydrofurfuryl.

2. A composition as described in claim 1 in which $R'$ and $R^2$ represent alkyl groups and $x$ is 2.

3. A composition as described in claim 1, in which the stabilizer is dibutyl tin didodecylmercaptide of the formula $$(C_4H_9)_2Sn(S.C_{12}H_{25})_2$$

the mercaptide serving as a stabilizer for the plastic and being present in the proportion of 0.5 part to 5 parts for 100 of the resin.

4. A composition as described in claim 1, in which the stabilizer is diphenyl tin didodecylmercaptide of the formula $$(C_6H_5)_2Sn(SC_{12}H_{25})_2$$

5. A plastic composition characterized by improved heat stability and non-blooming at temperatures as high as 350° F., the plastic composition comprising a blend of polyvinyl chloride resin and a stabilizer therefor of the type formula $$Sn(S.R')_4$$

in which $R'$ represents an alkyl group containing 1 to 18 carbon atoms.

6. A composition as described in claim 5 in which the stabilizer is tin tetradodecylmercaptide of the formula $$Sn(SC_{12}H_{25})_4$$

7. A composition as described in claim 5 in which the stabilizer is tin tetraphenylmercaptide of the formula $$Sn(SC_6H_5)_4$$

8. A composition of improved heat stability comprising a blend of a polyvinyl chloride resin and 0.5 to 5.0%, based on the weight of the resin in said composition, of a mercaptide as the stabilizer therefor, the mercaptide being a compound of the type formula $$(R^1S)_2SnR^2_2$$

wherein $R^1$ and $R^2$ represent alkyl radicals containing 1 to 18 carbons each.

References Cited in the file of this patent

UNITED STATES PATENTS

| | | |
|---|---|---|
| 1,573,738 | Oechslin | Feb. 16, 1926 |
| 2,376,313 | Reiff | May 15, 1945 |
| 2,476,422 | Leiniger | July 19, 1949 |
| 2,479,918 | Fincke et al. | Aug. 23, 1949 |
| 2,489,518 | Burt | Nov. 29, 1949 |